United States Patent
Suzuki et al.

(10) Patent No.: US 12,191,716 B2
(45) Date of Patent: Jan. 7, 2025

(54) ROTOR OF ROTATING ELECTRIC MACHINE AND ROTATING ELECTRIC MACHINE

(71) Applicant: Mitsubishi Electric Corporation, Tokyo (JP)

(72) Inventors: Junya Suzuki, Tokyo (JP); Mitoru Yabe, Tokyo (JP); Hideya Nishikawa, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 18/011,652

(22) PCT Filed: Aug. 20, 2020

(86) PCT No.: PCT/JP2020/031378
§ 371 (c)(1),
(2) Date: Dec. 20, 2022

(87) PCT Pub. No.: WO2022/038727
PCT Pub. Date: Feb. 24, 2022

(65) Prior Publication Data
US 2023/0261534 A1    Aug. 17, 2023

(51) Int. Cl.
*H02K 1/27*    (2022.01)
*H02K 1/278*   (2022.01)
*H02K 1/28*    (2006.01)

(52) U.S. Cl.
CPC .............. *H02K 1/28* (2013.01); *H02K 1/278* (2013.01)

(58) Field of Classification Search
CPC ................................ H02K 1/28; H02K 1/278
See application file for complete search history.

(56) References Cited

U.S. PATENT DOCUMENTS

| | | | |
|---|---|---|---|
| 2009/0001839 A1 | 1/2009 | Masayuki et al. | |
| 2015/0001978 A1* | 1/2015 | Haga ................... | H02K 1/274 |
| | | | 310/156.12 |
| 2019/0363594 A1* | 11/2019 | Qin ..................... | H02K 1/278 |

FOREIGN PATENT DOCUMENTS

WO    2007/080888 A1    7/2007

OTHER PUBLICATIONS

International Search Report for PCT/JP2020/031378, dated Oct. 20, 2020.

* cited by examiner

*Primary Examiner* — Thomas Truong
(74) *Attorney, Agent, or Firm* — Sughrue Mion, PLLC; Richard C. Turner

(57) ABSTRACT

A base portion of a magnet holder attached to a rotor core of a rotor has a press-fit pin press-fitted into a press-fit hole provided at an end surface of the rotor core. An arm portion of the magnet holder has a holder rib which protrudes inward in the radial direction of an output shaft and of which one end surface in the circumferential direction serves as a pressing surface, and a come-off prevention protrusion inserted into an insertion groove provided at an outer circumferential surface of the rotor core. Magnets are located between the rotor core and the magnet holders, one end surface in the circumferential direction of each magnet contacts with the pressing surface, and another end surface contacts with a core rib protruding from the rotor core.

20 Claims, 8 Drawing Sheets

ROTOR OF ROTATING ELECTRIC MACHINE AND ROTATING ELECTRIC MACHINE

CROSS REFERENCE TO RELATED APPLICATIONS

This application is a National Stage of International Application No. PCT/JP2020/031378 filed Aug. 20, 2020.

TECHNICAL FIELD

The present disclosure relates to a rotor of rotating electric machine, and a rotating electric machine.

BACKGROUND ART

One example of conventional rotors of rotating electric machines having permanent magnets includes a magnet holder having a holder base provided to a rotary shaft, a plurality of holder arms formed so as to protrude from the holder base in the axial direction of the rotary shaft, and elastic bridge portions connecting the holder base and the holder arms (see, for example, Patent Document 1).

CITATION LIST

Patent Document

Patent Document 1: WO2007/080888

SUMMARY OF THE INVENTION

Problems to be Solved by the Invention

However, in the rotor described in Patent Document 1, positioning and fixation of magnets in the circumferential direction are made by elasticity of the bridge portions. Therefore, there is a possibility that positioning accuracy of permanent magnets in the circumferential direction is deteriorated, thus causing cogging torque and torque ripple. In addition, such cogging torque and torque ripple might deteriorate performance of a rotating electric machine. The present disclosure has been made to solve the above problem, and an object of the present disclosure is to provide a rotor of rotating electric machine, and a rotating electric machine, that enable improvement in positioning accuracy for magnets in the circumferential direction.

Solution to the Problems

A rotor of rotating electric machine according to the present disclosure includes: a rotor core fixed to an output shaft; a plurality of magnets arranged on an outer circumference of the rotor core along a circumferential direction of the output shaft; and a plurality of magnet holders each having an arm portion extending along an axial direction of the output shaft and a base portion retaining the arm portion. The base portion has a press-fit pin press-fitted into a press-fit hole provided at an end surface of the rotor core. The arm portion has a holder rib which protrudes inward in a radial direction of the output shaft and of which one end surface in the circumferential direction serves as a pressing surface, and a protrusion inserted into an insertion groove provided at an outer circumferential surface of the rotor core. The magnets are located between the rotor core and the magnet holders, one end surface in the circumferential direction of each magnet contacts with the pressing surface, and another end surface in the circumferential direction of each magnet contacts with a core rib protruding from the rotor core.

Effect of the Invention

The rotor of rotating electric machine according to the present disclosure enables improvement in positioning accuracy for magnets in the circumferential direction.

DESCRIPTION OF EMBODIMENTS

Figure 1:
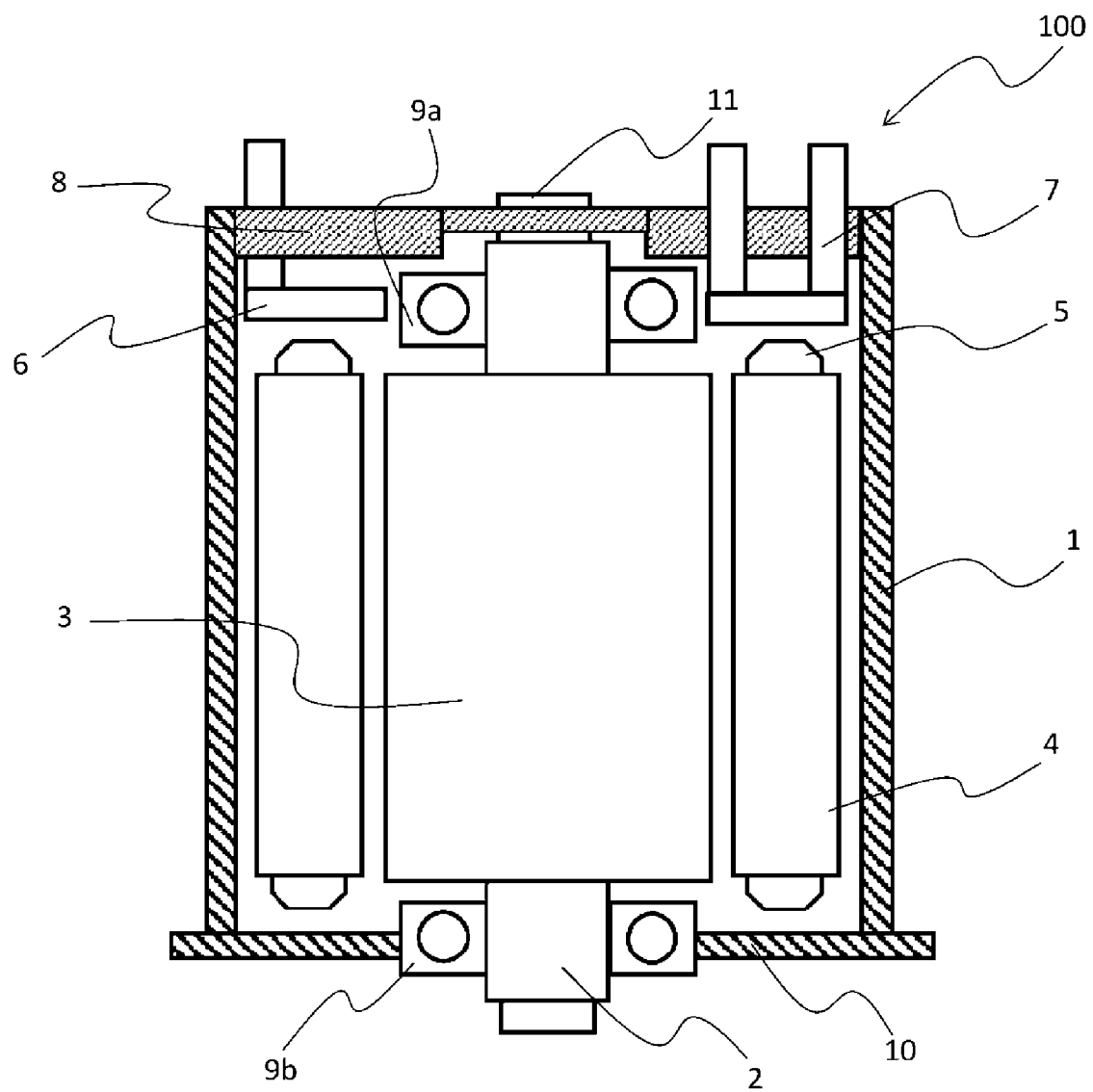
FIG. 1 is a sectional view of a rotating electric machine in embodiment 1.

Embodiments of a rotor of rotating electric machine, and a rotating electric machine, according to the present disclosure, will be described below with reference to the drawings. In the drawings, the same or similar components are denoted by the same reference characters. For the purpose of avoiding unnecessary redundant description and facilitating the understanding of the skilled person, detailed description of a well-known matter and repetitive description of substantially the same configuration may be omitted.

Embodiment 1

Embodiment 1 will be described with reference to FIG. 1 to FIG. 8B. FIG. 1 is a sectional view of a rotating electric machine in embodiment 1. A rotating electric machine 100 mainly includes a rotor 3 (i.e., rotor of rotating electric machine) stored in a hollow cylindrical motor case 1, a stator 4, and an output shaft 2 penetrating the rotor 3. The rotor 3 is fixed to the output shaft 2, and the outer circumferential surface of the rotor 3 is opposed to the inner circumferential surface of the stator 4 with an air gap therebetween. On the outer circumferential surface of the rotor 3, a plurality of pairs of permanent magnets (not shown) are arranged for forming field poles at the outer circumferential surface of the rotor 3.

The stator 4 is wound with armature windings 5 for three phases (U phase, V phase, W phase). An annular wiring portion 6 is provided near the upper side of the armature windings 5 in FIG. 1. Although not shown, the armature windings 5 and the annular wiring portion 6 are connected by welding or the like via upper ends of the armature windings 5. A winding end 7 provided at the annular wiring portion 6 extends so as to penetrate a frame 8 described later in an extending direction of the axial line of the rotating electric machine 100, i.e., the axial direction of the output shaft 2. The winding end 7 is connected to the armature winding 5 via the annular wiring portion 6. In the following description, an "output-shaft direction" refers to the axial direction of the output shaft 2, a "radial direction" refers to the radial direction of the output shaft 2, and a "circumferential direction" refers to the radial circumferential direction of the output shaft 2.

The winding end 7 is formed such that three conductors respectively connected to an end of the U-phase winding, an end of the V-phase winding, and an end of the W-phase winding of the armature windings 5 are collected.

On the upper and lower sides of the rotor 3 in FIG. 1, a pair of first bearings 9a and a pair of second bearings 9b for rotatably supporting the output shaft 2 are provided, respectively. The first bearings 9a are provided at a center part of the frame 8. The frame 8 serves as a cover for closing the inside of the rotating electric machine 100. The second bearings 9b are fixed to a structure 10 on an output side of the rotating electric machine 100.

A sensor rotor 11 is fixed at an end on a non-output side of the output shaft 2 (side opposite to the side where the output-side structure 10 is located). A rotation sensor (not shown) is provided at a non-output-side end surface of the sensor rotor 11 with a gap therebetween. The sensor rotor 11 has one pair or a plurality of pairs of permanent magnets. The rotation sensor located separately from the sensor rotor 11 detects change in a magnetic field generated from the permanent magnets of the sensor rotor 11 rotating along with rotation of the output shaft 2, converts the detected change into an electric signal, and transmits the electric signal to a control device (not shown) of the rotating electric machine 100, or the like. Although the sensor rotor 11 and the rotation sensor are described as a magnetic sensor type here, a type other than the magnetic sensor type may be used, e.g., a resolver may be used. Alternatively, a Hall sensor may be used.

Figure 2:
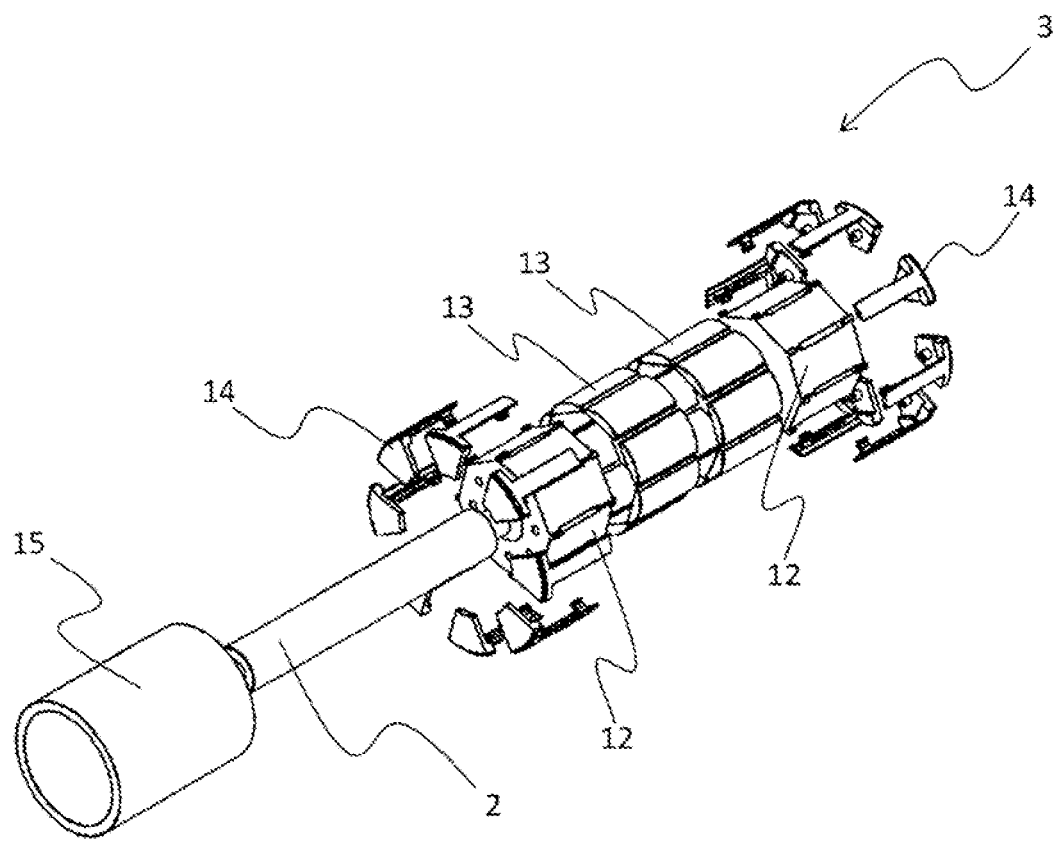
FIG. 2 is an exploded perspective view of a rotor in embodiment 1.

FIG. 2 is an exploded perspective view of the rotor in embodiment 1. A rotor core 12 is fixed to the output shaft 2, and magnets 13 which are segment-type permanent magnets are attached to the outer circumference of the rotor core 12. The magnets 13 are attached to the rotor core 12 by magnet holders 14 made of synthetic resin, for example, so as to be positioned and fixed. The number of the magnet holders 14 is the same as the number of the magnets 13 attached to the rotor core 12. A hollow cylindrical cover 15 is attached on the outer side of the magnets 13. The cover 15 has a function of preventing a fraction of the magnet 13 from flying off to a surrounding area when the magnet 13 is damaged, and thus preventing the rotating electric machine 100 from being locked by the fraction of the magnet 13. The rotor 3 in embodiment 1 has a stage-skewed structure such that the rotor 3 has two-stage rotor cores 12 shifted from each other in the circumferential direction. The magnet holders 14 provided to the rotor cores 12 all have the same shape. In embodiment 1, at one rotor core 12, eight magnets 13 are attached along the circumferential direction of the rotor core 12. Therefore, in the entire rotor 3, eight magnets 13 are arranged in each of two rows. Since the rotor 3 has a stage-skewed structure as described above, the magnets 13 having the same polarities in the adjacent rows are attached at positions shifted from each other by a predetermined step angle in the circumferential direction.

Figure 3:
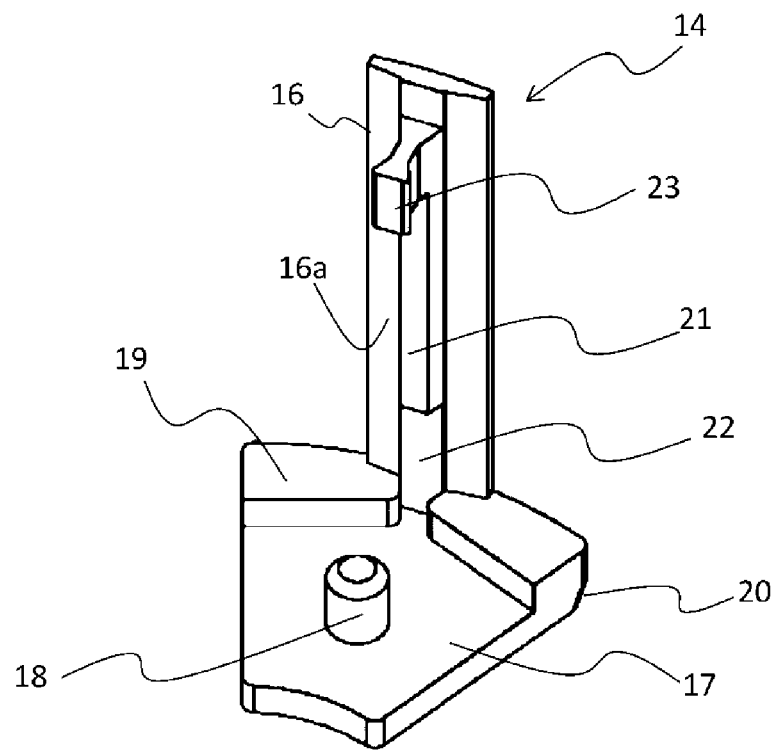
FIG. 3 is a perspective view of a magnet holder according to embodiment 1.

FIG. 3 is a perspective view of the magnet holder according to embodiment 1. The magnet holder 14 has a base portion 17 of which one side is on the inner side in the radial direction of the output shaft 2 and the other side is on the outer side in the radial direction when the magnet holder 14 is attached to the rotor core 12. The base portion 17 has a sector shape expanding from the inner side in the radial direction toward the outer side in the radial direction. On one surface of the base portion 17, an arm portion 16 is provided at a center part on the outer side in the radial direction. The arm portion 16 is for retaining the magnet 13 in the radial direction and the circumferential direction and extends in the output-shaft direction.

On the surface on the arm portion 16 side of the base portion 17, a press-fit pin 18 protrudes at a center part. The press-fit pin 18 is used for fixing the magnet holder 14 to the rotor core 12. On the surface on the arm portion 16 side of the base portion 17, an end on the outer side in the radial direction is raised toward the arm portion side so as to be stepped, thus forming an output-shaft-direction retaining portion 19 for retaining the magnet 13 in the output-shaft direction. The output-shaft-direction retaining portion 19 contacts with one-side end surface of the magnet 13 in the output-shaft direction so as to retain the magnet 13 in the output-shaft direction. A non-arm-portion side (side opposite to the arm portion 16 side) of a radial-direction outer end surface of the base portion 17 is tapered inward in the radial direction, thus forming a guide portion 20. Owing to the guide portion 20, the rotor core 12 can be easily stored in the cover 15 at the time of assembling the rotor 3. In view of ease of molding of the magnet holder 14, a through hole may be provided to the base portion 17 as appropriate.

The arm portion 16 retains the magnet 13 in the radial direction by a radial-direction inner surface 16a thereof. That is, as described later, when the magnet 13 is inserted between the rotor core 12 and the magnet holder 14, the radial-direction inner surface 16a of the arm portion 16 contacts with the a radial-direction outer surface of the magnet 13, thereby retaining the magnet 13 in the radial direction. The arm portion 16 is provided with a holder rib 21 for retaining a circumferential-direction side surface of the magnet 13. The holder rib 21 protrudes inward in the radial direction from a circumferential-direction center part of the arm portion 16. A cutout 22 is provided on the base portion 17 side of the holder rib 21. The output-shaft-direction length of the cutout 22 is set to be greater than two times the length of the press-fit pin 18. At an end of the holder rib 21 on a non-base-portion side (side opposite to the base portion 17 side), a come-off prevention protrusion 23 (i.e., a protrusion) is provided so as to protrude further inward in the radial direction from the holder rib 21. The come-off prevention protrusion 23 is for preventing the magnet holder 14 from coming off in the circumferential direction when the magnet holder 14 is attached to the rotor core 12.

Figure 4:
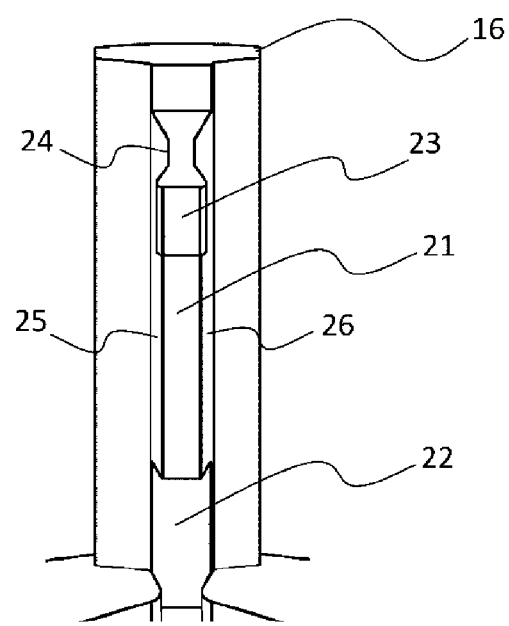
FIG. 4 is a detailed view of an arm portion according to embodiment 1.

FIG. 4 is a detailed view of the arm portion according to embodiment 1, when the arm portion 16 shown in FIG. 3 is seen outward in the radial direction. The circumferential-direction width of the come-off prevention protrusion 23 is smaller at a base part thereof than at a distal end thereof, thus forming a constricted portion 24. One surface in the circumferential direction of the holder rib 21 serves as a pressing surface 25, and a surface of the holder rib 21 opposite to the pressing surface 25 serves as a relief surface 26. As described later in detail, when the magnets 13 are attached to the rotor core 12, the pressing surface 25 contacts with a circumferential-direction side surface of the magnet 13, to press the magnet 13, and the relief surface 26 is separate from the magnet 13 without contacting with the magnet 13.

Figure 5:
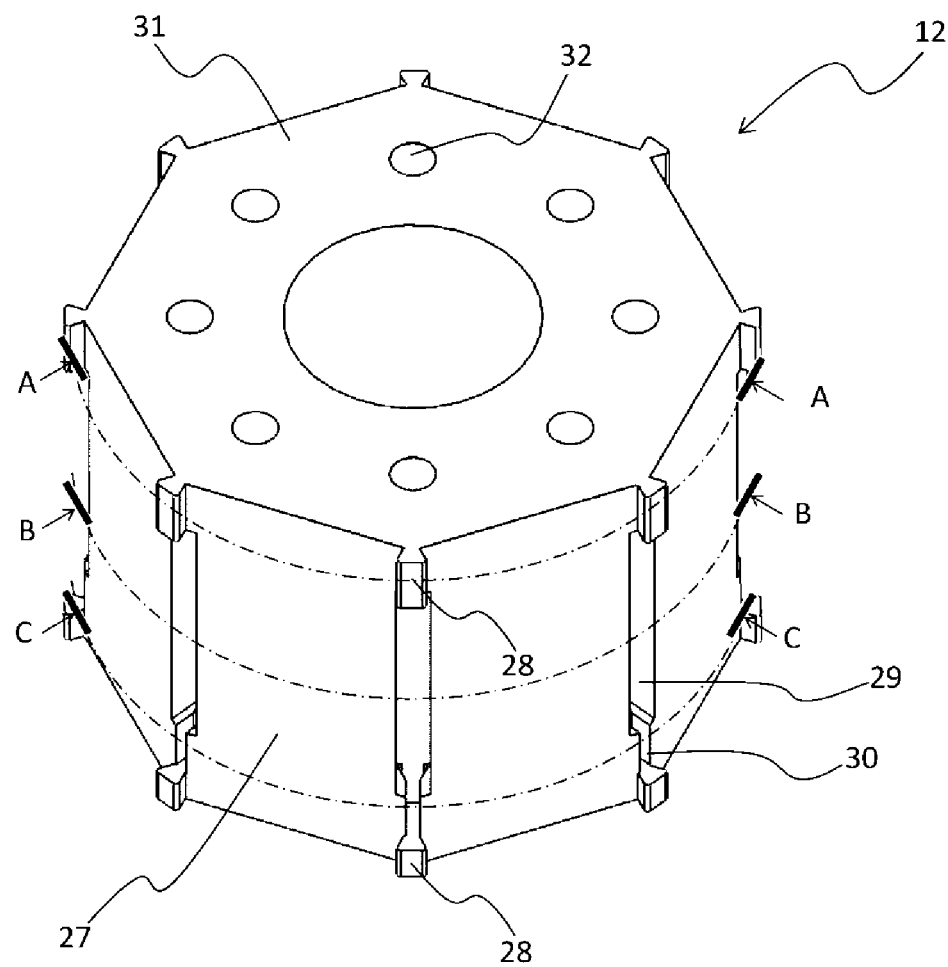
FIG. 5 is a perspective view of a rotor core according to embodiment 1.

FIG. 5 is a perspective view of the rotor core according to embodiment 1. At both ends in the output-shaft direction of an outer circumferential surface 27 of the rotor core 12 having substantially an octagonal prism shape, a plurality of core ribs 28 protruding outward in the radial direction are provided at predetermined intervals in the circumferential direction. The core ribs 28 are for positioning the magnets 13 by pressing the magnets 13, and are provided at two locations for each magnet 13. In embodiment 1, since eight magnets 13 are attached to one rotor core 12, the core ribs 28 are provided at sixteen locations for one rotor core 12.

An insertion groove 29 and a lock groove 30 are provided between the core ribs 28 at two locations for each magnet 13. The insertion groove 29 is a groove in which the come-off prevention protrusion 23 of the magnet holder 14 is to be inserted, and the circumferential-direction width of the insertion groove 29 is not less than the circumferential-direction width of the come-off prevention protrusion 23. The lock groove 30 is a groove for preventing the come-off prevention protrusion 23 from coming off outward in the radial direction, and has such a shape to which the distal end of the come-off prevention protrusion 23 is fitted. The output-shaft-direction lengths of the insertion groove 29 and the lock groove 30 are greater than the output-shaft-direction length of each come-off prevention protrusion 23. On an output-shaft-direction one-side end surface 31, a plurality of press-fit holes 32 are provided at predetermined intervals in the circumferential direction. The press-fit hole 32 is a hole into which the press-fit pin 18 of the magnet holder 14 is to be press-fitted and fixed. In embodiment 1, since eight magnets 13 are attached to the rotor core 12, eight magnet holders 14 are attached. Therefore, eight press-fit holes 32 are provided. The output-shaft-direction lengths of the insertion groove 29 and the lock groove 30 may be changed as appropriate in a range not less than the output-shaft-direction length of the come-off prevention protrusion 23. The distance between the output-shaft-direction one-side end surface 31 and the lock groove 30 is smaller than the distance between the base portion 17 and the come-off prevention protrusion 23 of the magnet holder 14. Thus, when the press-fit pin 18 is press-fitted into the press-fit hole 32, the come-off prevention protrusion 23 is fitted to the lock groove 30.

Figure 6A:
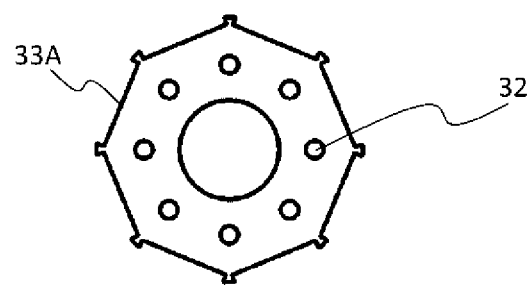
FIG. 6A is a sectional view along line A-A in FIG. 5 and is a plan view of a first core plate according to embodiment 1.
Figure 6B:
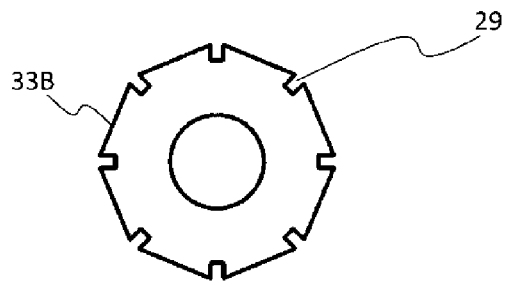
FIG. 6B is a sectional view along line B-B in FIG. 5 and is a plan view of a second core plate according to embodiment 1.
Figure 6C:
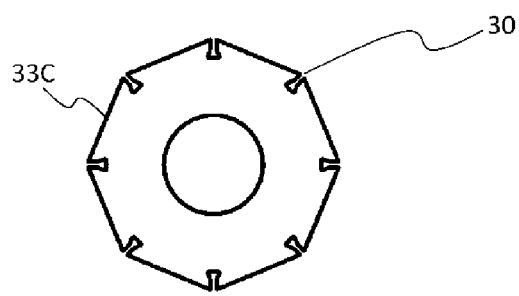
FIG. 6C is a sectional view along line C-C in FIG. 5 and is a plan view of a third core plate according to embodiment 1.

FIG. 6A is a sectional view along line A-A in FIG. and is a plan view of a first core plate according to embodiment 1. FIG. 6B is a sectional view along line B-B in FIG. 5 and is a plan view of a second core plate according to embodiment 1. FIG. 6C is a sectional view along line C-C in FIG. 5 and is a plan view of a third core plate according to embodiment 1. The rotor core 12 is formed by stacking first core plates 33A, second core plates 33B, and third core plates 33C made of electromagnetic steel sheets and each having a thickness of about 0.5 mm, and then welding the stacking side surface. A plurality of first core plates 33A are stacked to form an end part of the rotor core 12 on the output-shaft-direction one-side end surface 31 side and the press-fit holes 32. A plurality of second core plates 33B are stacked to form a center part of the rotor core 12 and the insertion grooves 29. A plurality of third core plates 33C are stacked to form an end part of the rotor core 12 on the side opposite to the output-shaft-direction one-side end surface 31, and the lock grooves 30.

Figure 7:
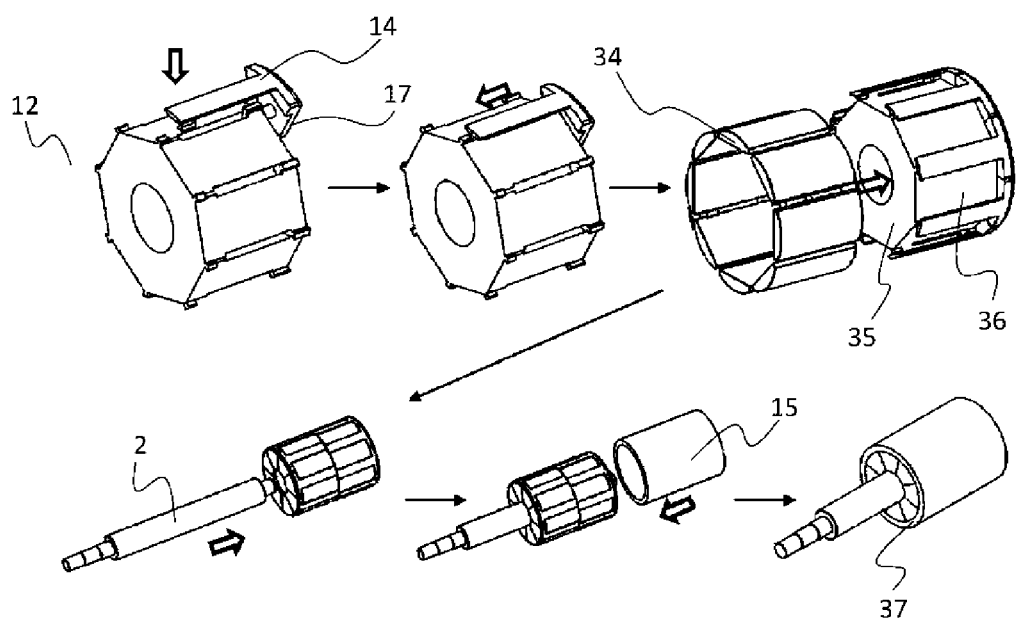
FIG. 7 shows a procedure for assembling the rotor in embodiment 1.

Next, a procedure for assembling the rotor 3 in embodiment 1 will be described. FIG. 7 shows the procedure for assembling the rotor in embodiment 1. First, the come-off prevention protrusion 23 of the magnet holder 14 is inserted into the insertion groove 29 of the rotor core 12 from the outer side in the radial direction. Then, the magnet holder 14 is moved in the output-shaft direction so that the press-fit pin 18 is press-fitted and fixed into the press-fit hole 32 of the rotor core 12. At this time, the magnet 13 is subsequently inserted in the output-shaft direction from the non-base-portion side of the magnet holder 14. In embodiment 1, eight magnets 13 are inserted for one rotor core 12. Push-in surfaces 34 of the magnets 13 are pushed in simultaneously so as to be flush with an output-shaft-direction opposite-side end surface 35 of the rotor core 12, whereby the magnets 13 are inserted into a gap 36 between the rotor core 12 and the magnet holders 14. Here, the push-in surface 34 is an end surface of the magnet 13 on the non-base-portion side and is a surface to be pushed when the magnet 13 is inserted. The output-shaft-direction opposite-side end surface 35 is an output-side end surface on the side opposite to the output-shaft-direction one-side end surface 31.

Next, the magnets 13 and the magnet holders 14 are attached also to another rotor core 12 through the same procedure, the two rotor cores 12 are arranged along the output-shaft direction with their centers aligned with each other, and the output shaft 2 is press-fitted into the center holes of the two rotor cores 12 having the magnets 13 attached thereto. At this time, the two rotor cores 12 are arranged such that the magnets 13 respectively attached to the two rotor cores 12 have the same polarities. When the output shaft 2 has been press-fitted, a part of the output shaft 2 protrudes from the rotor core 12. Finally, the cover 15 is moved from the side opposite to the side where the output shaft 2 protrudes, so as to be fitted to the two rotor cores 12, and then ends of the cover 15 on both sides in the output-shaft direction are bent inward in the radial direction, to form bent portions 37, whereby the rotor 3 is completed. In arranging the two rotor cores 12, their respective output-shaft-direction opposite-side end surfaces 35 are opposed to each other so that the magnet holders 14 attached to the respective rotor cores 12 do not interfere with each other.

In the magnet holder 14, the output-shaft-direction length of the cutout 22 is set to be greater than two times the length of the press-fit pin 18. Therefore, when the come-off prevention protrusion 23 of the magnet holder 14 is inserted into the insertion groove 29 of the rotor core 12 from the outer side in the radial direction and then the magnet holder 14 is moved in the output-shaft direction, the holder rib 21 is prevented from interfering with the core rib 28. Thus, attachment of the magnet holder 14 is facilitated.

Figure 8A:
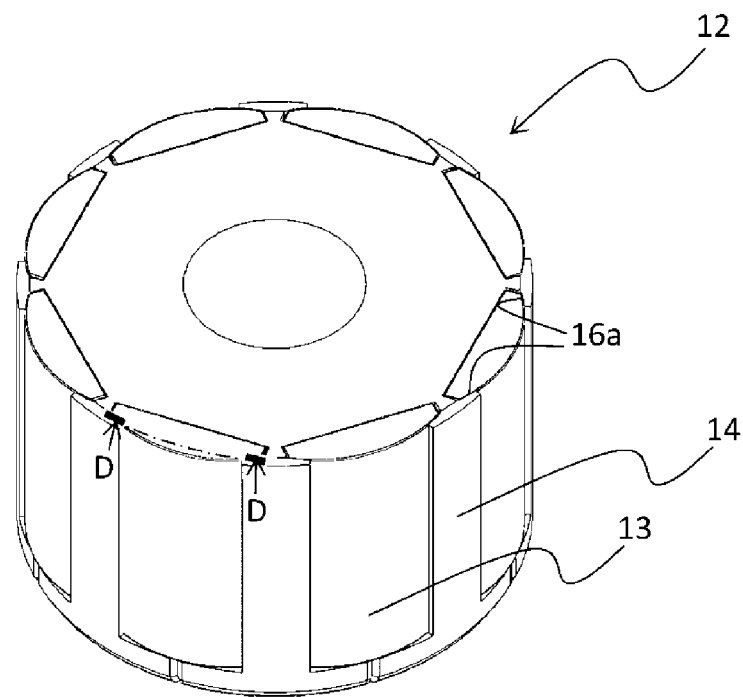
FIG. 8A is a perspective view showing the rotor core with magnets attached thereto.
Figure 8B:
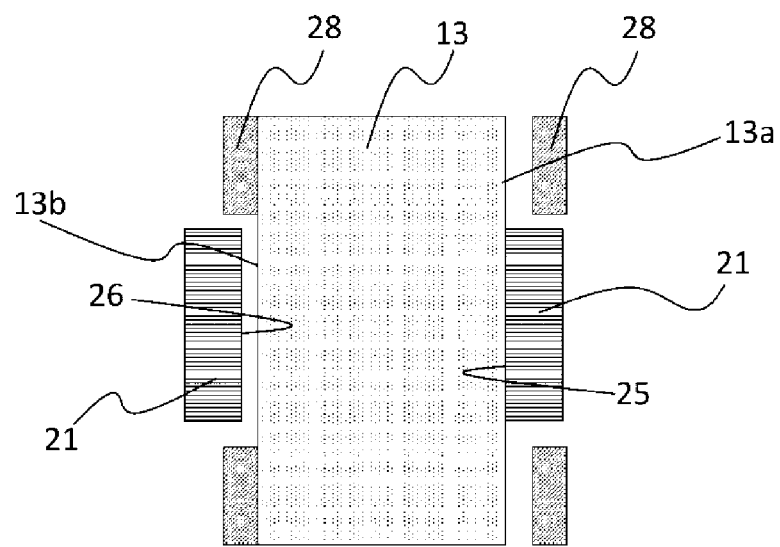
FIG. 8B is a sectional view along line D-D in FIG. 8A.

Next, retention and positioning for the magnets 13 will be described. FIG. 8A is a perspective view showing the rotor core with the magnets attached thereto, and FIG. 8B is a sectional view along line D-D in FIG. 8A. As shown in FIG. 8A, the magnet holders 14 are located on both sides in the circumferential direction of each magnet 13, and both ends in the circumferential direction of the radial-direction outer surface of the magnet 13 respectively contact with the radial-direction inner surfaces 16*a* of the arm portions 16 of the magnet holders 14 on both sides. Thus, the magnet 13 is pressed by the radial-direction inner surfaces 16*a*, whereby the magnet 13 is retained in the radial direction. Meanwhile, as shown in FIG. 8B, a center part of a circumferential-direction one-side surface 13*a* of the magnet 13 contacts with the pressing surface 25 of the holder rib 21, and both upper and lower end parts of the circumferential-direction one-side surface 13*a* are separate from the core ribs 28. A center part of a circumferential-direction opposite-side surface 13*b* of the magnet 13 is separate from the relief surface 26 of the holder rib 21, and both upper and lower end parts of the circumferential-direction opposite-side surface 13*b* contact with the core ribs 28. That is, the magnet 13 is retained by the pressing surface 25 on one side in the circumferential direction and is retained by the core ribs 28 on the opposite side in the circumferential direction. Thus, since the magnet 13 is retained on both sides in the circumferential direction, positioning in the circumferential direction is accurately made. In addition, since the core ribs 28 and the pressing surface 25 are at different positions in the up-down direction, the magnet 13 is provided with retention means at positions shifted from each other in the up-down direction on one side and the opposite side in the circumferential direction, and this combination makes a structure in which the upper end part, the center part, and the lower end part are all retained and positioned in the circumferential direction. The dimensional relationship is set such that, when the magnet 13 is pressed against the core ribs 28, the relief surface 26 does not protrude toward the magnet 13 side relative to the core ribs 28 and thus the magnet 13 is assuredly pressed against the core ribs 28.

Effects obtained by the device configured as described above will be described.

In embodiment 1, the magnet is supported from both sides in the circumferential direction by the pressing surface provided to the holder rib of the magnet holder and the core ribs of the rotor core, whereby fixation and positioning in the circumferential direction can be made. Thus, positioning accuracy for the magnet in the circumferential direction can be improved.

In addition, the relief surface is provided on the side opposite to the pressing surface, whereby the magnet is assuredly pressed against the core ribs. Thus, positioning accuracy for the magnet in the circumferential direction is further improved.

In addition, the cutout is provided to the holder rib of the magnet holder so as to prevent interference with the core rib at the time of insertion into the rotor core. Therefore, the core ribs for positioning can be provided at two locations at both ends in the output-shaft direction, for each magnet. Thus, positioning for the magnet in the circumferential direction relative to the rotor core can be made more accurately.

In addition, the come-off prevention protrusion of the magnet holder is fitted to the lock groove of the rotor core, whereby the magnet holder is prevented from coming off in the radial direction and the non-base-portion side of the magnet holder is prevented from opening in the radial direction.

In addition, in the output-shaft direction, the magnet is retained by the same-polarity magnet attached to the adjacent rotor core and the output-shaft-direction retaining portion of the magnet holder, whereby displacement in the output-shaft direction of the magnet is prevented.

In addition, as compared to a case where the magnet is retained in the output-shaft direction by only a retention force of the bent portions of the cover, a press-fit force of the magnet holder and the rotor core is added for the retention and therefore the magnet can be fixed more strongly in the output-shaft direction.

In addition, since the guide portion 20 is provided to the base portion of the magnet holder, the cover can be easily fitted to the rotor core.

In a rotating electric machine, cogging torque, torque ripple, and the like may occur because of positional displacement between the magnet and the rotor core in the circumferential direction and the output-shaft direction, and backlash in the radial direction which occurs when the magnet is inserted. In this case, the performance of the rotating electric machine might be deteriorated. In embodiment 1, as described above, in the circumferential direction, the radial direction, and the output-shaft direction, accurate positioning can be made and the magnet is assuredly fixed. Thus, cogging torque, torque ripple, and the like as described above are reduced, whereby deterioration of the performance of the rotating electric machine due to cogging torque, torque ripple, and the like is suppressed.

Embodiment 2

Next, embodiment 2 will be described with reference to FIG. 9 and FIG. 10. Embodiment 2 is different from embodiment 1 in that the output-shaft-direction retaining portion of the magnet holder is separated from the base portion and is located on the side opposite to the base portion. The configurations of the rotating electric machine 100 and the rotor core 12 are the same as those in embodiment 1 and therefore description thereof is omitted.

Figure 9:
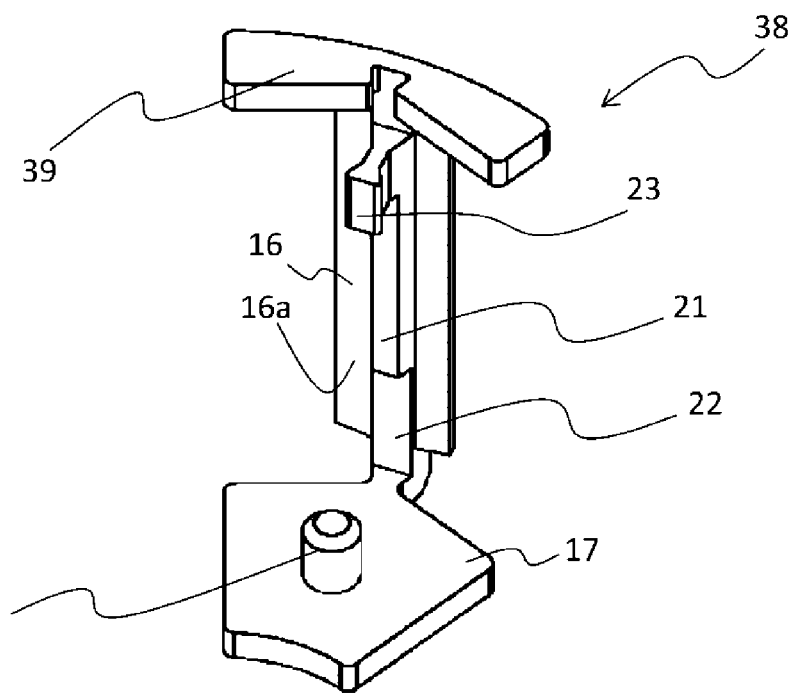
FIG. 9 is a perspective view of a magnet holder according to embodiment 2.
Figure 10:
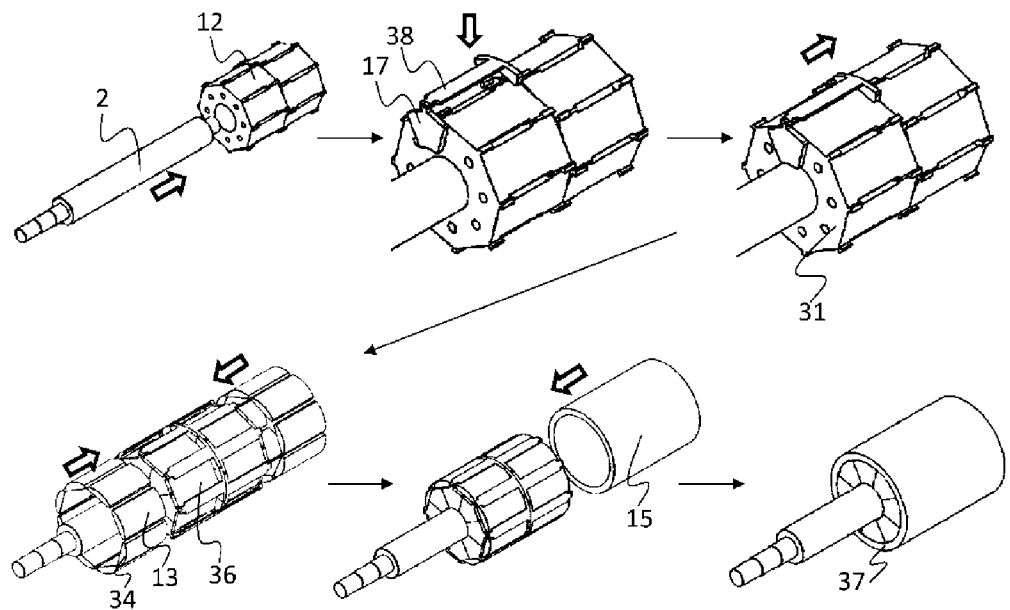
FIG. 10 shows a procedure for assembling a rotor in embodiment 2.

FIG. 9 is a perspective view of a magnet holder according to embodiment 2. A magnet holder 38 is composed of the base portion 17 and the arm portion 16 as in the magnet holder 14 of embodiment 1. The press-fit pin 18, the guide portion 20, the holder rib 21, the cutout 22, and the come-off prevention protrusion 23 are also the same as those in embodiment 1.

On the non-base-portion side of the arm portion 16, an output-shaft-direction retaining portion 39 extending toward both sides in the circumferential direction is provided. Therefore, the output-shaft-direction retaining portion 19 is not provided to the base portion of the magnet holder 38. The shape of the output-shaft-direction retaining portion 39 is the same as the shape of the output-shaft-direction retaining portion 19 in embodiment 1.

Next, a procedure for assembling the rotor 3 in embodiment 2 will be described. FIG. 10 shows a procedure for assembling the rotor in embodiment 2. First, the output shaft 2 is press-fitted into the center holes of two rotor cores 12. At this time, their respective output-shaft-direction opposite-side end surfaces 35 are opposed to each other as in embodiment 1.

Next, the magnet holder 38 is attached to the rotor core 12 to which the output shaft 2 has been press-fitted at the center. The come-off prevention protrusion 23 of the magnet holder 38 is inserted into the insertion groove 29 of the rotor core 12 from the outer side in the radial direction, and then the magnet holder 38 is moved in the output-shaft direction so that the press-fit pin 18 is press-fitted and fixed into the press-fit hole 32 of the rotor core 12. Thereafter, eight magnets 13 are inserted for one rotor core 12 from the base portion 17 sides of the magnet holders 38 attached to the rotor core 12. At this time, the push-in surfaces 34 of the magnets 13 are pushed in simultaneously so as to be flush with the output-shaft-direction one-side end surface 31 of the rotor core 12, whereby the magnets 13 are inserted into the gap 36 between the rotor core 12 and the magnet holders 38. Finally, the cover 15 is fitted to the two rotor cores 12 from the side opposite to the side where the output shaft 2 protrudes, and then ends of the cover 15 on both sides in the output-shaft direction are bent inward in the radial direction, to form the bent portions 37, whereby the rotor 3 is completed. Retention and positioning of the magnets 13 are the same as those in embodiment 1.

According to embodiment 2, the same effects as in embodiment 1 can be obtained.

In addition, since the output-shaft-direction retaining portion is provided on the non-base-portion side of the arm portion instead of the base portion, it becomes possible to attach the magnet after the output shaft is press-fitted into the rotor core, and therefore positional displacement of the magnet does not occur when the output shaft is press-fitted into the rotor core. Thus, more accurate positioning can be performed. In addition, since the output shaft can be press-fitted into each rotor core one by one, it is not necessary to arrange the two rotor cores with their centers aligned with each other at the time of press-fitting the output shaft. Thus, the equipment configuration is simplified and workability is improved.

Embodiment 3

Next, embodiment 3 will be described with reference to FIG. 11 and FIG. 12. Embodiment 3 is different from embodiments 1 and 2 in that the magnet holder has a plurality of come-off prevention protrusions. The configuration of the rotating electric machine 100 is the same as that in embodiment 1 and therefore description thereof is omitted.

Figure 11:
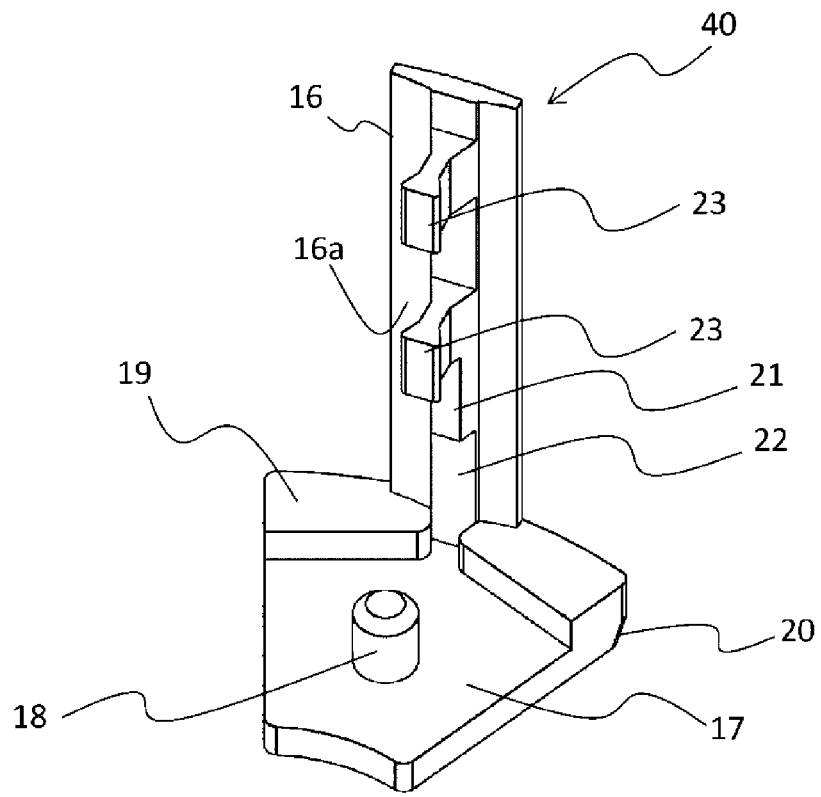
FIG. 11 is a perspective view of a magnet holder according to embodiment 3.

FIG. 11 is a perspective view of a magnet holder according to embodiment 3. A magnet holder 40 is composed of the base portion 17 and the arm portion 16 as in the magnet holder 14 of embodiment 1. The press-fit pin 18, the output-shaft-direction retaining portion 19, the guide portion 20, and the cutout 22 are also the same as those in embodiment 1.

The holder rib 21 is provided with two come-off prevention protrusions 23 arranged along the output-shaft direction. The shape of each come-off prevention protrusion 23 is the same as that in embodiments 1 and 2. The holder rib 21 is also the same as that in embodiments 1 and 2 except for the number of the come-off prevention protrusions 23.

Figure 12:
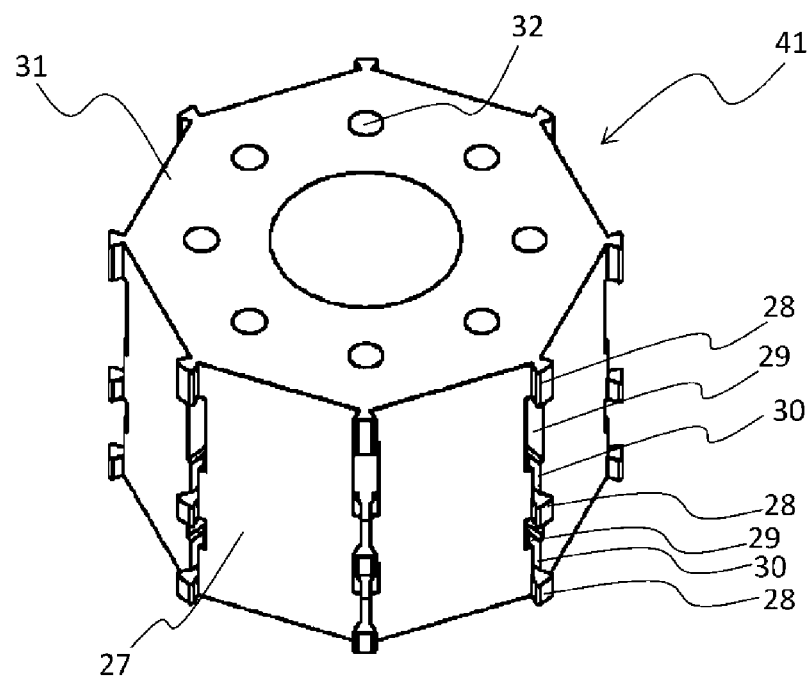
FIG. 12 is a perspective view of a rotor core according to embodiment 3.

FIG. 12 is a perspective view of a rotor core according to embodiment 3. At both ends in the output-shaft direction of an outer circumferential surface 27 of a rotor core 41 having substantially an octagonal prism shape, a plurality of core ribs 28 protruding outward in the radial direction are provided at predetermined intervals in the circumferential direction. As in embodiment 1, the core rib 28 is for positioning the magnet 13 by pressing the magnet 13. In embodiment 3, three core ribs 28 are provided for each magnet 13. Also in embodiment 3, eight magnets 13 are attached to one rotor core 41, and therefore the core ribs 28 are provided at twenty-four locations for one rotor core 41.

Between the core ribs 28 at two locations for each magnet 13, the insertion grooves 29 and the lock grooves 30 are provided alternately two by two along the output-shaft direction. Among the two insertion grooves 29 and the two lock grooves 30, the insertion groove 29 and the lock groove 30 on the upper side correspond to the come-off prevention protrusion 23 close to the base portion 17 in the magnet holder 40. The insertion groove 29 and the lock groove 30 on the lower side correspond to the come-off prevention protrusion 23 far from the base portion 17 in the magnet holder 40. As in embodiment 1, the output-shaft-direction length of each of the insertion grooves 29 and the lock grooves 30 is greater than the output-shaft-direction length of the corresponding come-off prevention protrusion 23. In addition, the distance between the output-shaft-direction one-side end surface 31 and each lock groove 30 is smaller than the distance between the corresponding come-off prevention protrusion 23 and the base portion 17 of the magnet holder 40. Thus, when the press-fit pin 18 is press-fitted into the press-fit hole 32, each come-off prevention protrusion 23 is fitted to the corresponding lock groove 30. The other matters regarding the rotor core 41 are the same as the rotor core 12 in embodiment 1.

In assembling the rotor 3, the two come-off prevention protrusions 23 of the magnet holder 40 are inserted into the two insertion grooves 29 of the rotor core 41 from the outer side in the radial direction, and then the magnet holder 40 is moved in the output-shaft direction, whereby the press-fit pin 18 is press-fitted and fixed into the press-fit hole 32 of the rotor core 41. Insertion of the magnet 13, press-fitting of the output shaft 2, and attachment of the cover 15 are the same as those in embodiment 1.

Embodiment 3 may be combined with embodiment 2. In this case, the magnet 13 is inserted from the base portion side as in embodiment 2.

According to embodiment 3, the same effects as in embodiment 1 can be obtained.

In addition, since a plurality of come-off prevention protrusions for preventing the magnet holder from coming off in the radial direction are provided, stress applied to each come-off prevention protrusion is dispersed and thus the durability of the magnet holder is improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment. For example, in embodiments 1 to 3, the case of applying the feature according to the present disclosure to a rotating electric machine having a stage-skewed structure has been shown, but the feature according to the present disclosure may be applied to a motor not having a stage-skewed structure. In addition, in embodiments 1 to 3, the plurality of magnet holders attached to one rotor core each have the base portion and are divided from each other as seen over the entirety, but the base portion may be formed as one common base portion, and the magnet holder may be formed with the plurality of arm portions provided to the common base portion. In addition, the numbers of the magnets and the magnet holders are not limited to those described above.

DESCRIPTION OF THE REFERENCE CHARACTERS 2 output shaft
3 rotor
12, 41 rotor core
13 magnet
14, 38, 40 magnet holder
15 cover
16 arm portion
17 base portion
18 press-fit pin
19, 39 output-shaft-direction retaining portion
20 guide portion
21 holder rib
22 cutout
23 come-off prevention protrusion
25 pressing surface
26 relief surface
27 outer circumferential surface
28 core rib
29 insertion groove
30 lock groove
31 output-shaft-direction one-side end surface
32 press-fit hole
36 gap
37 bent portion
100 rotating electric machine

The invention claimed is:

1. A rotor of rotating electric machine, comprising:
a rotor core fixed to an output shaft;
a plurality of magnets arranged on an outer circumference of the rotor core along a circumferential direction of the output shaft; and
a plurality of magnet holders each having an arm portion extending along an axial direction of the output shaft and a base portion retaining the arm portion, wherein
the base portion has a press-fit pin press-fitted into a press-fit hole provided at an end surface of the rotor core,
the arm portion has a holder rib which protrudes inward in a radial direction of the output shaft and of which one end surface in the circumferential direction serves as a pressing surface, and a protrusion inserted into an insertion groove provided at an outer circumferential surface of the rotor core, and
the magnets are located between the rotor core and the magnet holders, one end surface in the circumferential direction of each magnet contacts with the pressing surface, and another end surface in the circumferential direction of each magnet contacts with a core rib protruding from the rotor core.

2. The rotor of rotating electric machine according to claim 1, wherein a cutout having a predetermined length is provided to the holder rib on a side where the base portion is present.

3. The rotor of rotating electric machine according to claim 2, wherein
at the outer circumferential surface of the rotor core, a lock groove to which the protrusion is fitted is provided adjacently to the insertion groove in the axial direction.

4. The rotor of rotating electric machine according to claim 3, wherein
the base portion has an output-shaft-direction retaining portion extending in the circumferential direction and retaining each magnet in the axial direction.

5. The rotor of rotating electric machine according to claim 3, wherein
the arm portion has an output-shaft-direction retaining portion extending in the circumferential direction from an end on a side opposite to the base portion side and retaining each magnet in the axial direction.

6. The rotor of rotating electric machine according to claim 3, wherein
a plurality of the protrusions are provided along the axial direction.

7. The rotor of rotating electric machine according to claim 2, wherein
the base portion has an output-shaft-direction retaining portion extending in the circumferential direction and retaining each magnet in the axial direction.

8. The rotor of rotating electric machine according to claim 2, wherein
the arm portion has an output-shaft-direction retaining portion extending in the circumferential direction from an end on a side opposite to the base portion side and retaining each magnet in the axial direction.

9. The rotor of rotating electric machine according to claim 2, wherein
a plurality of the protrusions are provided along the axial direction.

10. The rotor of rotating electric machine according to claim 1, wherein
at the outer circumferential surface of the rotor core, a lock groove to which the protrusion is fitted is provided adjacently to the insertion groove in the axial direction.

11. The rotor of rotating electric machine according to claim 10, wherein
the base portion has an output-shaft-direction retaining portion extending in the circumferential direction and retaining each magnet in the axial direction.

12. The rotor of rotating electric machine according to claim 10, wherein
the arm portion has an output-shaft-direction retaining portion extending in the circumferential direction from an end on a side opposite to the base portion side and retaining each magnet in the axial direction.

13. The rotor of rotating electric machine according to claim 10, wherein
a plurality of the protrusions are provided along the axial direction.

14. The rotor of rotating electric machine according to claim 1, wherein
the base portion has an output-shaft-direction retaining portion extending in the circumferential direction and retaining each magnet in the axial direction.

15. The rotor of rotating electric machine according to claim 14, wherein a plurality of the protrusions are provided along the axial direction.

16. The rotor of rotating electric machine according to claim 1, wherein
the arm portion has an output-shaft-direction retaining portion extending in the circumferential direction from an end on a side opposite to the base portion side and retaining each magnet in the axial direction.

17. The rotor of rotating electric machine according to claim 16, wherein
a plurality of the protrusions are provided along the axial direction.

18. The rotor of rotating electric machine according to claim 1, wherein
a plurality of the protrusions are provided along the axial direction.

19. The rotor of rotating electric machine according to claim 1, wherein
a plurality of the rotor cores are arranged along the axial direction, and the respective rotor cores are shifted from each other by a predetermined angle in the circumferential direction.

20. A rotating electric machine comprising the rotor of rotating electric machine according to claim 1.

* * * * *